(12) United States Patent
Flinck et al.

(10) Patent No.: US 11,671,372 B2
(45) Date of Patent: Jun. 6, 2023

(54) CONTROLLING SERVICE FUNCTION CHAINING (71) Applicant: NOKIA SOLUTIONS AND NETWORKS OY, Espoo (FI)

(72) Inventors: Hannu Flinck, Helsinki (FI); Janne Einari Tuononen, Nummela (FI); Ville Petteri Poyhonen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 465 days.

(21) Appl. No.: 16/336,998

(22) PCT Filed: Sep. 30, 2016

(86) PCT No.: PCT/EP2016/073433
§ 371 (c)(1),
(2) Date: Mar. 27, 2019

(87) PCT Pub. No.: WO2018/059707
PCT Pub. Date: Apr. 5, 2018

(65) Prior Publication Data
US 2019/0222521 A1 Jul. 18, 2019

(51) Int. Cl.
*H04L 47/20* (2022.01)
*H04L 45/02* (2022.01)
(Continued)

(52) U.S. Cl.
CPC .......... *H04L 47/20* (2013.01); *H04L 41/0893* (2013.01); *H04L 45/02* (2013.01); *H04L 45/64* (2013.01); *H04L 47/24* (2013.01); *H04L 47/2441* (2013.01); *H04L 69/22* (2013.01); *H04L 41/50* (2013.01)

(58) Field of Classification Search
CPC ..... H04L 47/20; H04L 47/2441; H04L 45/02; H04L 69/22; H04L 12/813; H04L 29/06; H04L 12/751; H04L 12/851; H04L 41/50; H04L 41/0893; H04L 45/64; H04L 47/24; H04L 41/0897
See application file for complete search history.

(56) References Cited

U.S. PATENT DOCUMENTS 9,723,106 B2 * 8/2017 Shen .................. H04L 45/44
9,973,401 B2 * 5/2018 Ryan .................. H04L 41/5009
(Continued)

OTHER PUBLICATIONS

International Search Report & Written Opinion dated Jul. 3, 2017 corresponding to International Patent Application No. PCT/EP2016/073433.

(Continued)

*Primary Examiner* — Hanh N Nguyen
(74) *Attorney, Agent, or Firm* — Squire Patton Boggs (US) LLP (57) ABSTRACT A service function chain including service functions which process user plane packets is controlled by providing (S21) a shared context comprising rules and policies for processing the user plane packets, the shared context being shared between the service functions of the service function chain, reading (S22) the shared context, and adjusting (S23) traffic flow across the service function chain based on the rules and policies associated with the read shared context.

22 Claims, 7 Drawing Sheets (51) Int. Cl.
  *H04L 47/24* (2022.01)
  *H04L 41/0893* (2022.01)
  *H04L 45/64* (2022.01)
  *H04L 47/2441* (2022.01)
  *H04L 69/22* (2022.01)
  *H04L 41/50* (2022.01)

(56) References Cited

U.S. PATENT DOCUMENTS

| | | | |
|---|---|---|---|
| 10,084,703 B2 * | 9/2018 | Kumar | H04L 49/3009 |
| 10,187,306 B2 * | 1/2019 | Nainar | H04L 45/64 |
| 2015/0334094 A1 | 11/2015 | Suresh et al. | |
| 2017/0257310 A1 * | 9/2017 | Patil | H04L 47/115 |

OTHER PUBLICATIONS

Bart Salaets: "Advanced Traffic Steering & Optimization Technologies," MENOG 2014, Mar. 30, 2014, pp. 1-31, XP055214882.
P. Quinn et al.: "Network Service Header; draft-ietf-sfc-nsh-05.txt<" Network Service Header; draft-IETF-SFC-NSH-05.txt, Internet Engineering Task Force, IEIF; May 27, 2016, pp. 1-38, XP015113233.
J. Halpern et al., "Service Function Chaining (SFC) Architecture," Internet Engineering Task Force (IETF); RFC 7665, Oct. 2015.
P. Quinn et al., "Network Service Header (NSH)," Internet Engineering Task Force (IEIF); RFC 8300, Jan. 2018.
3GPP TR 23.718 V13.0.0 (Sep. 2015), Techincal Report, 3rd Generation Partnership Project; Technical Specification Group Services and System Aspects; Architecture enhancement for flexible mobile service steering (Release 13), Sep. 2015.
3GPP TS 23.203 V14.0.0 (Jun. 2016), Technical Specification, 3rd Generation Partnership Project; Technical Specification Group Services and System Aspects; Policy and charging control architecture (Release 14), Jun. 2016.
L4-L7 Service Function Chaining Solution Architecture, Version 1.0, Jun. 14, 2015, ONF TS-027, OpenFlow, Open Networking Foundation.
Communication pursuant to Article 94(e) EPC dated Apr. 24, 2020 corresponding to European Patent Application No. 16778285.3.
Chinese Office Action issued in corresponding Chinese Patent Application No. 2016800897419 dated Nov. 10, 2020.

* cited by examiner

CONTROLLING SERVICE FUNCTION CHAINING

BACKGROUND OF THE INVENTION

Field of the Invention

The present invention relates to controlling service function chaining. In particular, the present invention relates to expressing conditionality in service function chaining in a communication network.

Related Background Art

Figure 11:
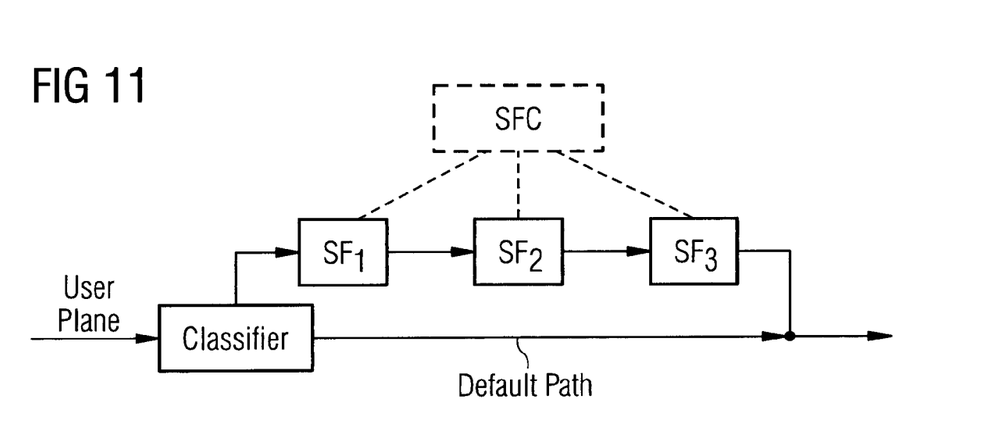
FIG. 11 shows a schematic diagram illustrating an example of a configuration of a regular SFC.

Prior art which is related to this technical field can e.g. be found in:
IETF:
  Service chain architecture is defined in RFC7665, https://datatracker.ietf.org/qldoc/rfc7665/
  NSH is defined in https://datatracker.ietf.org/doc/draft-ietf-sfc-nsh/
3GPP:
  Architecture enhancement for flexible mobile service steering, TR23.718: http://www.3gpp.org/ftp/Specs/archive/23_series/23.718/23718-d00.zip
  Policy and charging control architecture, TS23.203: http://www.3gpp.org/ftp/Specs/archive/23_series/23.203/23203-e00.zip
ONF:
  L4-L7 Service Function Chaining Solution Architecture, https://www.opennetworking.org/images/stories/downloads/sdn-resources/onf-specifications/L4-L7_Service_Function_Chaining_Solution_Architecture.pdf The following meanings for the abbreviations used in this specification apply:
AP Access Point
API Application Programming Interface
FW Firewall
FMSS Fixed Mobile Service Steering
IoT Internet of Things
IETF Internet Engineering Task Force
KPI Key Performance Indicator
ONF Open Networking Foundation
ODL OpenDayLight
OVS Open vSwitch
MEC Mobile Edge Computing
MVNO Mobile Virtual Network Operator
NAT Network Address Translation
NF Network Function Virtualization
NSH Network Service Header
PCRF Policy Control and Charging Rules Function
PF Precondition Function
PFG Precondition Function Group
P-GW Packet Gateway
REST Representational State Transfer
RPC Remote Procedure Call
SF Service Function
SFC Service Function Chaining
SFF Service Function Forwarder
SW Software
TSSF Traffic Steering Support Function
VNF Virtual Network Function
YANG Yet Another Next Generation A conventional Service Function Chaining (SFC) construction as adopted in a communication network is shown in FIG. 11 with the exception that Service Function Forwarders (SFFs) are omitted. In FIG. 11, for the installed SFC with three SFs (Service Functions) a classifier identifies packets on a user plane (referred to hereinafter as user plane packets) and decides whether to redirected them to the SFC path or leave them on the default path. The classifier may add a service chain encapsulation including a Network Service Header (NSH) to the redirected user plane packets. At the end of the service chain, the user plane packets processed by the service function chain return to the same path (the default path) as the user plane packets not classified for and processed by the SFC. Each SF processes received user plane packets according to a service it offers, and after the processing the user plane packets are either unmodified, modified or even dropped. Examples of such SFs are monitoring/collecting KPIs, applying some services for the received user plane packets like FW or proxy, modifying the received user plane packets like NAT or video/content optimization. In mobile communication networks, an SFC is used to produce value added services after Packet-GateWay (P-GW) functionality. Additionally, for MEC (Mobile Edge Computing) platforms, this functionality can be located also at edge/access network.

SUMMARY OF THE INVENTION

The way how user plane packets are processed in an SFC depends on a context (e.g. indicated in context information) of a service, its user(s) and related polices across the whole service function chain. An aggregate outcome may be different from individual decisions and actions of single SFs in the service function chain. A simple packet classification operation based, for example, on a five tuple of packet headers does not provide sufficient context for subsequent actions in the service function chain. Further, a context can also have dynamically changing components that depend on user feedback or flow/stream of user plane packets and other attributes like quota of used resources. Context information is a superset of metadata carried in the NSH. But the metadata in NSH is delivered only to downstream service functions following the flow of packets as illustrated in FIG. 11. Therefore, an upstream service function is not aware of a state of a downstream service function.

The present invention aims at overcoming the above drawbacks.

According to aspects of the invention, a method, a computer program product and an apparatus are provided as defined in the appended claims.

According to at least one embodiment of the invention, an SFC control plane function is provided that adjusts traffic flow across a service function chain. With this configuration it is possible to deal with dynamic service context which may change based on user's actions and generated traffic, affecting the whole SFC not just a single SF in the SFC.

Further, according to at least one embodiment of the invention, means to enforce and induce preconditions for an SFC are provided. For example, a precondition may be that a user device has to be at a certain location before an SFC execution is meaningful.

Still further, according to at least one embodiment of the invention, a mechanism to share metadata and change of context also for upstream service functions is provided.

In the following the invention will be described by way of embodiments thereof with reference to the accompanying drawings.

DESCRIPTION OF THE EMBODIMENTS

In the following, embodiments of the invention which comprise implementation examples and use cases will be described by referring to the accompanying drawings.

According to at least one embodiment of the invention, context aware conditionality is introduced for a whole service function chain adopted in a communication network, or sub chains of the service function chain.

According to an implementation example of the invention, this context awareness is expressed as a special kind of SF, which is located at some point in the service function chain. This special kind of SF or its condition function can be located externally to an operator network at an enterprise domain or MVNO. According to another implementation example of the invention, the context awareness is part of an entity at SFC control plane.

According to the at least one embodiment, this special SF or control plane entity controls the SFC execution based on a shared context between the SFs of the service function chain. In this application, this function or entity is also referred to as "condition function".

Figure 6:
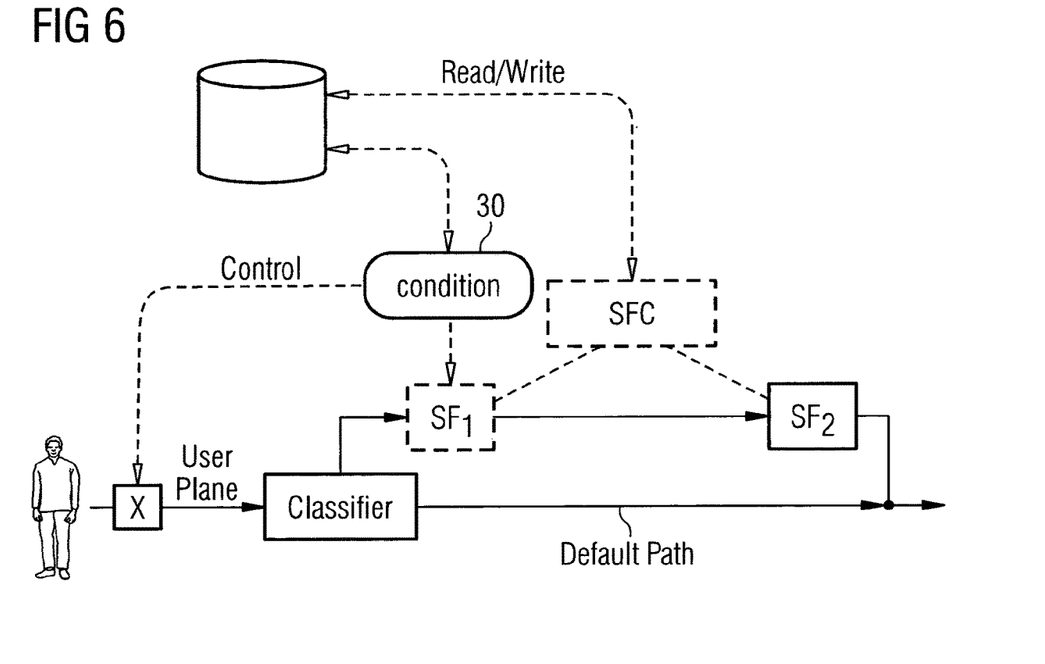
FIG. 6 shows a schematic diagram illustrating an environment of an SFC according to the first implementation example of the invention.

According to an implementation example of the invention, the shared context is implemented as a black board (shared data structure) between the participating SFs. The SFs update their context (e.g. indicated by context information), typically the metadata in the NSH, into the black board. In an alternative implementation example, an SFC controller collects the status from the SFs and updates a shared data base as shown in FIG. 6 to be described later. The condition function reads the shared context and acts based on service specific rules and policies associated with the read shared context to adjust traffic flow across the whole service function chain.

Figure 1:
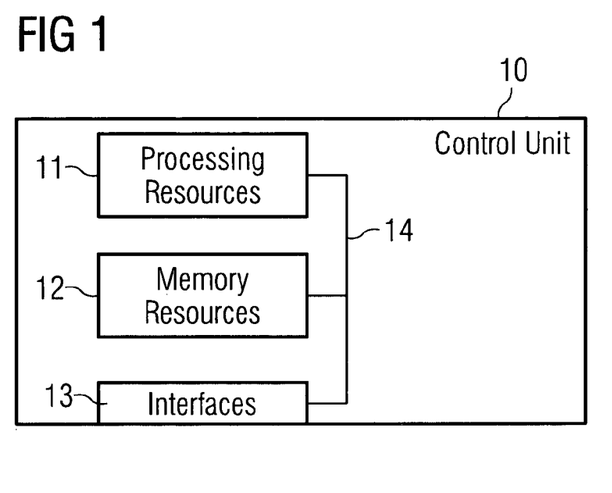
FIG. 1 shows a schematic block diagram illustrating a configuration of a control unit in which examples of embodiments of the invention are implementable.

FIG. 1 shows a schematic block diagram illustrating a configuration of a control unit 10 in which the condition function is implementable. The control unit 10 comprises processing resources 11 (e.g. processing circuitry), memory resources 12 (e.g. memory circuitry), and interfaces 13 (e.g. interface circuitry). The memory resources 12 may store a program that when executed by the processing resources 11 enable the control unit 10 to operate in accordance with the exemplary embodiments of this invention.

In general, the various embodiments of the invention may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Figure 2:
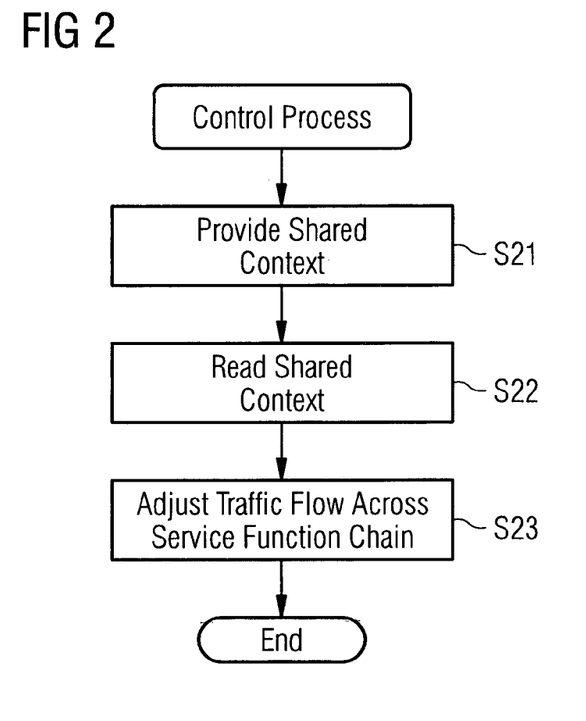
FIG. 2 shows a flowchart illustrating a control process according to an embodiment of the invention.

Before describing implementation examples of the invention, reference is made to FIG. 2 showing a flowchart illustrating a control process according to an embodiment of the invention. The control process reflects at least part of the condition function and may be implemented by the control unit 10.

The control process illustrated in FIG. 2 is for controlling a service function chain adopted in a communication network, which includes service functions which process packets on a user plane (which are referred to as user plane packets). In step S21, a shared context is provided which comprises rules and policies for processing the user plane packets. The shared context is shared between the service functions of the service function chain, and may be a shared data structure as described above. Some SFs may be agnostic or only consumers for the shared context. Shared context captures, e.g., UE, application and service provider criteria used in context aware conditionality.

In step S22, the shared context is read, and in step S23, traffic flow across the service function chain is adjusted based on the rules and policies associated with the read shared context.

According to at least some implementation examples of the invention, actions of the condition function have different life times like "one time only" or "run time" including periodic and continuous runs. The former is well suited for a case where, for instance, a conditionality is as precondition (implemented by a first SF of an SFC) for the rest of the SFC. In other words, without satisfying this precondition, the SFC is not applied. The latter is more like a continuous checkpoint in the SFC where an SF implementing the condition decides on where a user plane packet should be forwarded to, i.e., forwarded to the next SF or returned to the default path.

Context aware conditionality may be a generic one or it may have a special scope like device specific, user specific, service specific, time specific, location specific or even any combination of those, but not limited thereto. The outcome of conditionality guides the acceptance to proceed with the service provided by SFC user plane.

According to at least some embodiments of the invention, the condition function executes at least some of the following actions which, however, are not limited to the listing below:

Reading and updating collected status/context information from the SFs of the SFC to generate aggregated shared context of the SFC.

Modifying NSH metadata as a regular SF to match the policies and rules of the shared context.

Provisioning a new SF with or without proxy or SFC as needed.

Branching an SFC to another SFC as needed, e.g. by updating an SFF of the SFC or by acting as SFF of the SFC.

Updating a classifier (e.g. to redirect user plane packets) as needed.

Dropping, modifying and inserting packets as needed.

Figure 3:
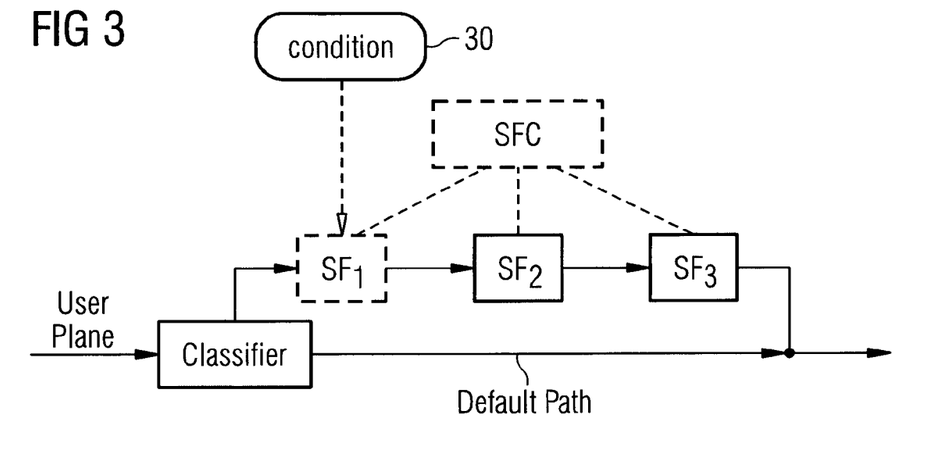
FIG. 3 shows a schematic diagram illustrating an example of a configuration of an SFC according to a first implementation example of the invention.
Figure 4:
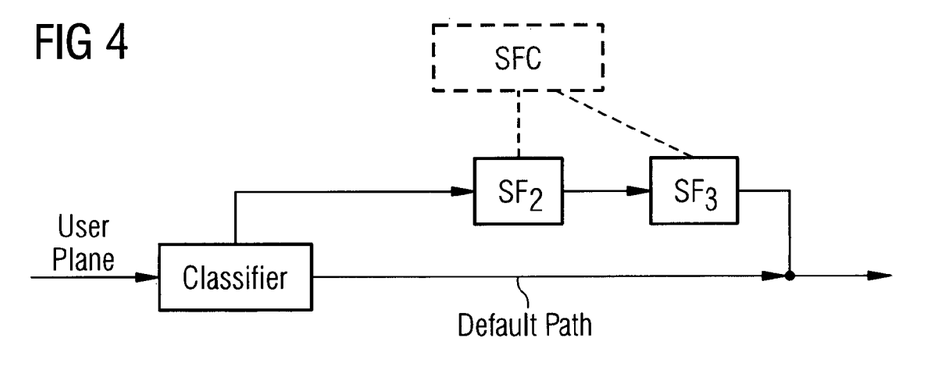
FIG. 4 shows a schematic diagram illustrating an example of a configuration of the SFC according to the first implementation example of the invention.

FIGS. 3 and 4 each show a schematic diagram illustrating an example of a configuration of an SFC according to a first implementation example of the invention. The SFC comprises SFs SF1, SF2 and SF3, and a classifier identifies user plane packets to be redirected to the SFC. The SF1 implements a precondition for entering the SFC. FIG. 3 further shows a condition function 30 which controls the SFs, e.g. configures the SF1 with the precondition. In FIG. 3 a situation is shown in which the precondition for entering the SFC is not satisfied yet.

FIG. 4 shows a situation in which the precondition for entering the SFC is met. In FIG. 4, the SF1 is removed from the SFC. However, it is also possible to disable the SF1 instead of removing it. If the SFC is used for multiple users, SF1 can be disabled for one user, but enabled for others.

Figure 5:
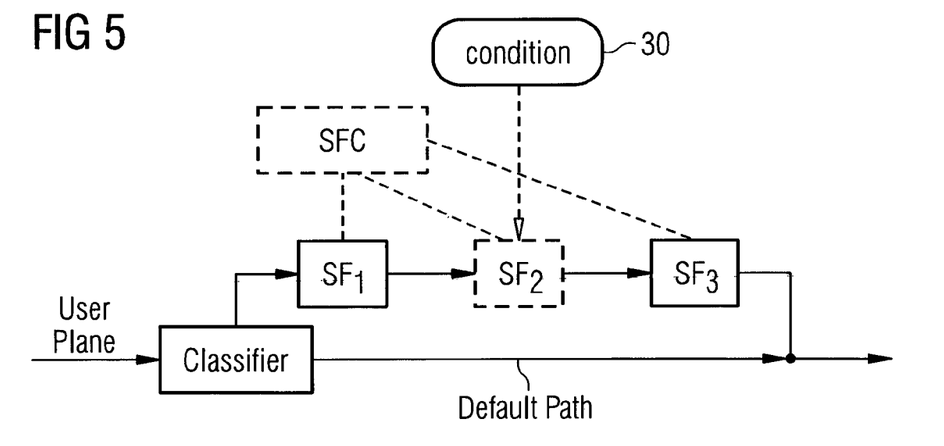
FIG. 5 shows a schematic diagram illustrating an example of a configuration of an SFC according to a second implementation example of the invention.

FIG. 5 shows a schematic diagram illustrating an example of a configuration of an SFC according to a second implementation example of the invention.

As illustrated in FIG. 5, the SFC comprises SFs SF1, SF2 and SF3, and a classifier identifies user plane packets to be redirected to the SFC. FIG. 5 further shows the condition function 30 which controls the SFs, e.g. configures the SF2 with a run time condition. The SF2 implements the run time condition and based on how its condition is satisfied, it decides either to forward the user plane packets towards the SF3 or to redirect them back to the default path.

The condition implemented in the first and second implementation examples can have different forms, i.e., one or multiple metrics in decision taking for a resulting decision on whether or not the condition is met. The metrics can be locally provided in the SFs or they can be externally provided to the SFs and, for instance, be refreshed periodically.

FIG. 6 shows a schematic diagram illustrating an environment of an SFC according to the first implementation example of the invention, in which changing context is updated by an SFC controller. In FIG. 6, an SFC is shown comprising SF1 implementing a precondition and SF2. A classifier identifies user plane packets to be redirected to the SFC. Further, FIG. 6 shows a black board as a data storage where dynamically changing context (context information) is updated by the SFC controller provided in block "SFC" in FIG. 6. In an alternative implementation example of the invention, the SFs update their status/information in the database directly.

The condition function 30 reads the context information from the database, and controls the provision and run time of the classifier and SFs based on the rules and policies associate to a given service context read from the database.

It should be noted that in the figures above, the condition function is represented as tied into the traffic/SFC direction, but this is not the case. In those figures, just two-directional SFCs are not used. In other words, for two-directional service function chains different condition functions can be used per direction. Or alternatively, a condition function can be shared for both directions. One effect of this is that in a case of two-directional service function chains, a set of SFs can be different per direction and can also be implemented in different locations in a network.

In the following, use cases of the invention are presented. The first use case relates to applying the invention in an Internet of Things (IoT) based smart environment, and the second use case relates to applying the invention to control NF to adjust network conditions on a user plane and forthcoming data sessions.

Figure 7:
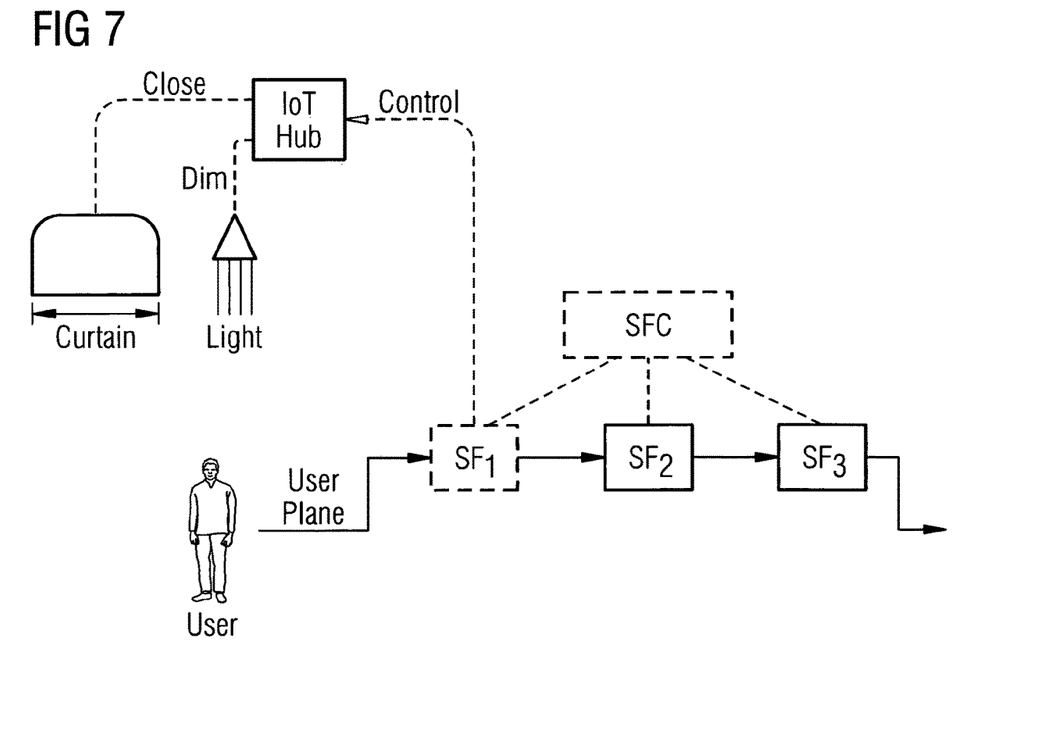
FIG. 7 shows a schematic diagram illustrating a first use case of the invention.

FIG. 7 shows a schematic diagram illustrating the first use case. In this use case a smart meeting room is considered that is equipped with sensors, actuators and remotely controlled lighting and curtains. All the meeting room facilities are accessible for those who are located in the meeting room and are authorized being there.

In the use case shown in FIG. 7 it is assumed that a pre-set user specific SFC containing three SFs SF1, SF2 and SF3 is not activated or has not been provisioned yet. The SF1 represents one-time only pre-conditionality used to control IoT devices through IoT Hub in the smart meeting room. Meeting room environment forms a part of the context of this service function chain that assumes a number of other services. Two remaining SFs, SF2 and SF3, are regular SFs, for example, they implement video optimizer and proxy.

A process in the use case is as follows. When a user is entering the meeting room, he/she is detected, for example, when his/her smart device is connecting to a local Wi-Fi AP (Access Point). Depending on the smart device, the SF1 implementing the pre-conditionality may push a pop-up dialog into the smart device to ask whether the user wants to close the curtains (0-100%) and have the lights dimmed (0-100%). Alternatively, the SF1 is able to detect adequate user content flows (video stream) that benefit from the IoT enabled facility services and initiate a similar pop-up dialog.

After the user's preferences are collected either directly from the user or from pre-provisioned policies, the SF1 enables the requested modifications in lighting and curtains accordingly. Because of the assumption that pre-conditionality is one-time only, the last task of the SF1 is to remove (or disable) itself from the SFC leaving SF2 and SF3 left in the service function chain.

Figure 8:
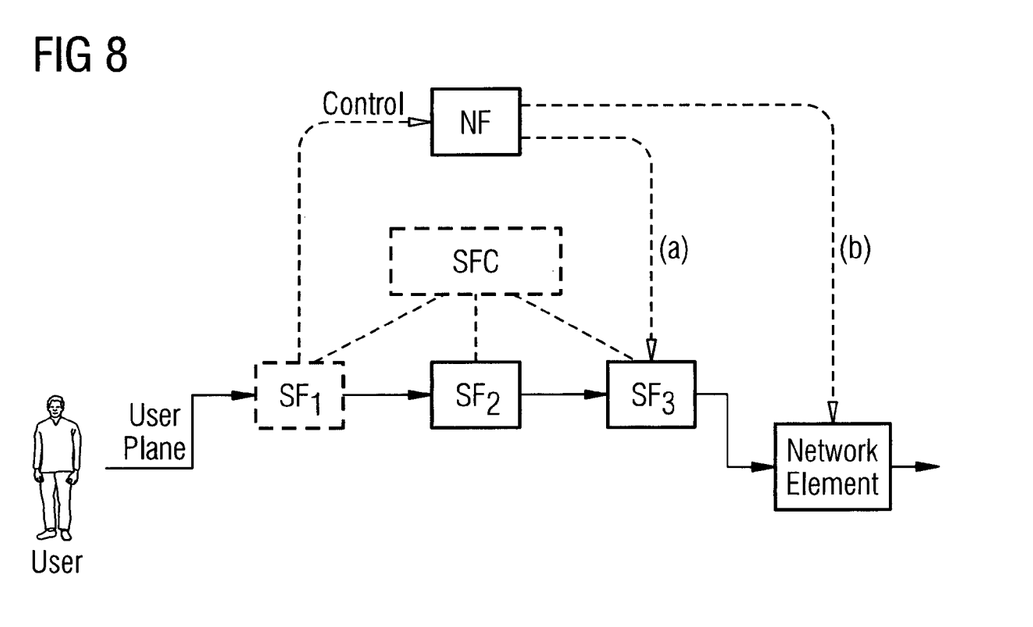
FIG. 8 shows a schematic diagram illustrating a second use case of the invention.

In the use case shown in FIG. 8, the invention is applied to set conditions for resources of a network via Network Function (NF). FIG. 8 shows a pre-set SFC containing three SFs SF1, SF2 and SF3, of which SF1 is a one-time only pre-conditional SF designed to initiate to control the user plane behavior through NF for the user. As it can be seen, NF, when enabled, can be set to control SF(s) (a) or external functions/resources (b), such as firewalls.

The process is as follows. When the user is attaching to the network, the network detects it. This time there is no dialog, and the SF1 automatically after detecting the user (and e.g. after fetching user policies) sends a signal (e.g. with user preferences) to the NF, which then optimizes the user plane packets for the user. In this use case, SF3 may be, for example, a specific charging function, which is initiated for the user (as indicated by arrow (a) in FIG. 8), and another control signal (indicated by arrow (b) in FIG. 8) from the NF may open a user/service specific entry to the firewall.

Figure 9:
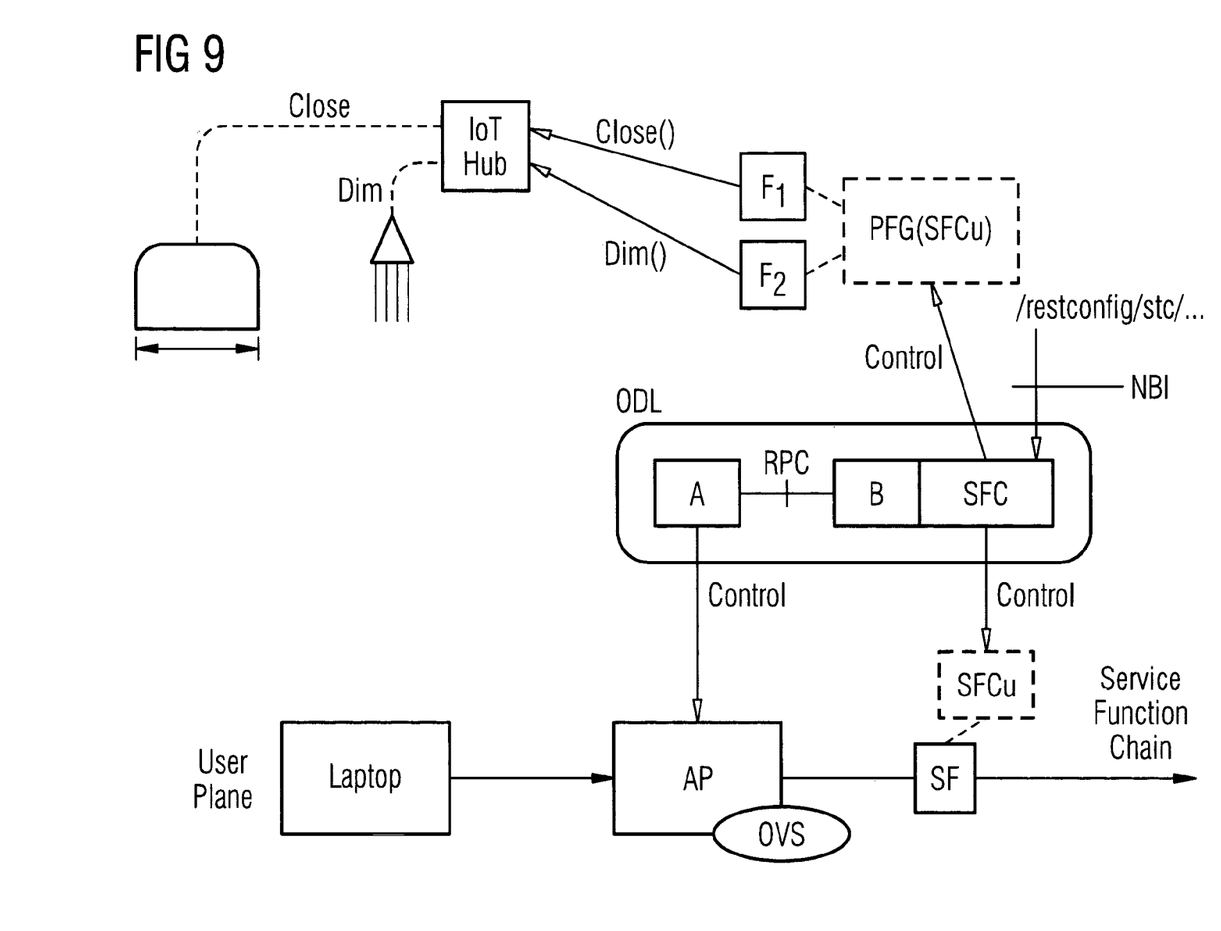
FIG. 9 shows a schematic diagram illustrating a first implementation example of the first use case of the invention.

FIG. 9 shows a schematic diagram illustrating a system according to a first implementation example of the first use case of the invention. In particular, FIG. 9 shows an implementation alternative for an ODL (OpenDayLight) SDN controller for supporting a pre-conditional SF to adjust light conditions of a meeting room for video streaming.

An SFC entity inside the ODL represents regular SFC SW and B is its extension to implement pre-conditionality. The pre-conditional SF is implemented as Precondition Function Group (PFG) which has its own YANG model in ODL's SFC to enable its configuration via REST API. Once an SFCu is created, it is marked as "has precondition" and this indicates to the system to not enable the SFCu during its creation. Also a PFG representing pre-conditionality is configured. Once the user enters to the meeting room and attaches his laptop to an AP (Access Point), the user is identified. When the user opens an Internet browser, the user is asked whether he would like the local light conditions to be adjusted or not. After the user has confirmed this, ODL is contacted and asked to proceed with the preconditions. Then the SFC informs the PFG(SFCu) to take care of light conditions, which then dim lights and close curtains via IoT specific front ends F1 and F2. The control signaling itself is performed via IoT Hub, which adds an abstraction on top of IoT REST APIs and therefore different protocols and their parameterization can be used behind IoT Hub from PFG point of view.

Figure 10:
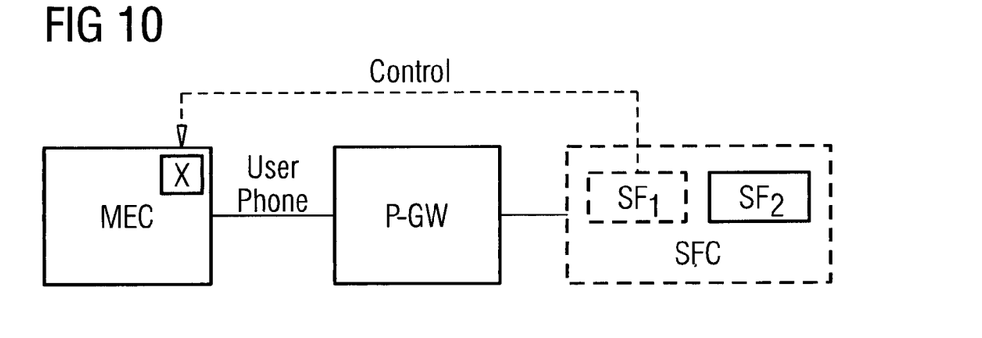
FIG. 10 shows a schematic diagram illustrating a second implementation example of the first use case of the invention.

FIG. 10 shows a schematic diagram illustrating a second implementation example of the first use case of the invention. In particular, FIG. 10 depicts an example where conditionality is applied to mobile edge computing of a mobile network. This enables feeding back control to an intelligent edge (MEC) to adjust subscriber's radio resources and user plane according to a currently used SFC. To be more precise, when SF1 in the SFC, which implements the conditionality, is initiated this is indicated to the MEC as shown by the dashed-line arrow in FIG. 10, and the SFC applied for the subscriber's data session is recognized by the MEC. This knowledge can then be used in between eNodeB and Gi to adjust user plane related network resources.

Figure 12:
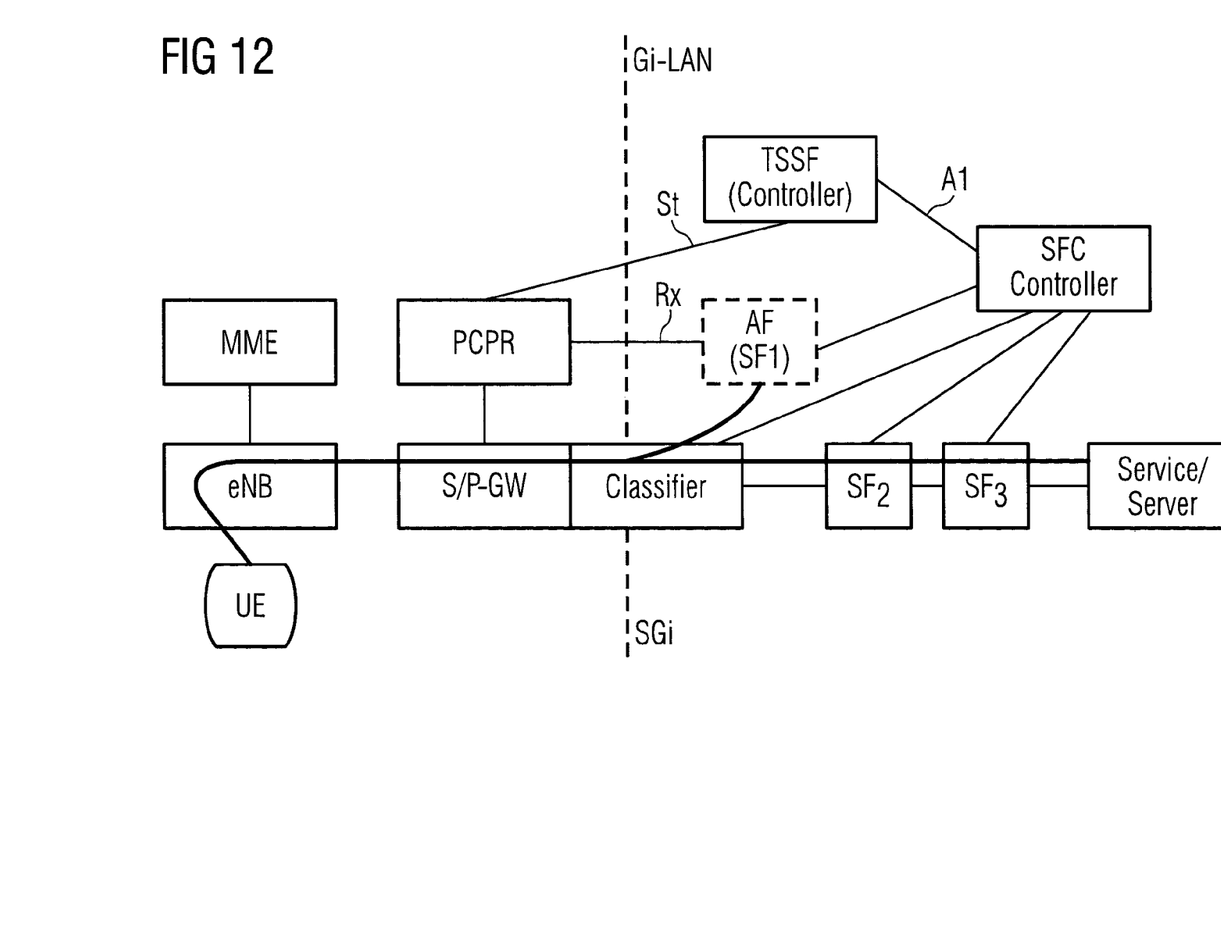
FIG. 12 shows a schematic diagram illustrating a third implementation example of the first use case of the invention.

FIG. 12 shows a schematic diagram illustrating a third implementation example of the first use case of the invention, when applied to a 3GPP FMSS (Fixed Mobile Service Steering) architecture. A TSSF is a function that receives traffic steering control information from a PCRF via an St reference point and ensures that related traffic steering policy is enforced in an (S)Gi-LAN. A traffic steering policy is locally configured in the TSSF and is also used to express classifier rules of context aware conditionality. The St reference point enables the PCRF to provide traffic steering control information to the TSSF. The PCRF uses one or more pieces of information such as network operator's policies, user subscription, user's current RAT, network load status, application identifier, time of day, UE location, APN, related to a subscriber session and an application traffic as input for selecting a traffic steering policy. An AF (Application Function) communicates with a UE and collects user input to the context aware conditionality. The AF acts as SF1 of an SFC comprising the SF1, an SF2 and an SF3, which are controlled by an SFC controller. The SFC controller also controls a classifier, and is connected to the TSSF via a reference point A1.

The AF receives mobile network/subscription specific policies via an Rx reference point from the PCRF to complement context aware conditionality. Based on context aware conditionality the AF can request the PCRF via the Rx reference point to adjust traffic and service steering related policies and rules in the TSSF. The SFC controller may request the TSSF via reference point A1 to manipulate its traffic policies and rules that are monitored by the SFC controller via the same reference point A1.

According to an aspect of the invention, an apparatus for controlling a service function chain including service functions which process user plane packets is provided. The apparatus may comprise the control unit 10 illustrated in FIG. 1. The apparatus may be configured to execute the control process illustrated in FIG. 2.

The apparatus comprises means for providing a shared context comprising rules and policies for processing the user plane packets, the shared context being shared between the service functions of the service function chain, means for reading the shared context, and means for adjusting traffic flow across the service function chain based on the rules and policies associated with the read shared context.

The apparatus may further comprise means for acquiring at least one of status and context information from the service functions to generate and update the shared context.

The apparatus may further comprise means for modifying metadata of a network service header of the user plane packets to match the rules and policies associated with the read shared context.

For example, the network service header is added to the user plane packets by a classifying unit that identifies, from a user plane packet flow, the user plane packets to be redirected to the service function chain.

The apparatus may further comprise at least one of means for providing one of a new service function and a service function chain, means for branching the service function chain to another service function chain, means for updating a service function forwarding unit to branch the service function chain to the other service function chain, means for updating the classifying unit that identifies, from the user plane packet flow, the user plane packets to be redirected to the service function chain, to redirect the user plane packets.

The apparatus may further comprise at least one of means for dropping, means for modifying and means for inserting user plane packets from/into the service function chain.

The apparatus may further comprise at least one of means for applying a condition to at least one of the service functions in the service function chain and causing at least one of the service functions to transmit a control signal outside the service function chain.

At least one of the service functions may be implemented in an application function, and the apparatus may comprise means for adjusting traffic and service steering related policies and rules in a traffic steering support function.

The apparatus may further comprise means for requesting a policy and charging rules function to adjust the traffic and service steering related policies and rules in the traffic steering support function.

The apparatus may comprise a controlling unit for controlling at least a part of the service functions, the controlling unit communicating with the traffic steering support function via a reference point.

The service function chain may comprise a first set of the service functions for processing the user plane packets in a forward direction corresponding to a default direction of transmitting the user plane packets, and a second set of the service functions for processing the user plane packets in a backward direction.

The above described means may be implemented by the processing resources (e.g. processing circuitry) 11, memory resources (e.g. memory circuitry) 12, and interfaces (e.g. interface circuitry) 13.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method of controlling a service function chain including service functions which process user plane packets, the method comprising:
providing a shared context comprising rules and policies for processing the user plane packets, the shared context being shared between the service functions of the service function chain;
reading the shared context;
adjusting traffic flow across the service function chain based on the rules and policies associated with the read shared context; and
applying a condition to at least one of the service functions in the service function chain that is checked at the service function.

2. The method of claim 1, comprising:
acquiring at least one of status and context information from the service functions to generate and update the shared context.

3. The method of claim 1, comprising:
modifying metadata of a network service header of the user plane packets to match the rules and policies associated with the read shared context.

4. The method of claim 3, wherein the network service header is added to the user plane packets by a classifying unit that identifies, from a user plane packet flow, the user plane packets to be redirected to the service function chain.

5. The method of claim 1, comprising:
providing one of a new service function and a service function chain.

6. The method of claim 1, comprising:
branching the service function chain to another service function chain.

7. The method of claim 6, comprising:
updating a service function forwarding unit to branch the service function chain to the other service function chain.

8. The method of claim 1, comprising:
updating a classifying unit that identifies, from a user plane packet flow, the user plane packets to be redirected to the service function chain, to redirect the user plane packets.

9. The method of claim 1, comprising:
at least one of dropping, modifying and inserting user plane packets from/into the service function chain.

10. The method of claim 1, comprising:
causing at least one of the service functions to transmit a control signal outside the service function chain.

11. The method of claim 1, wherein at least one of the service functions is implemented in an application function and the method comprises:
adjusting traffic and service steering related policies and rules in a traffic steering support function.

12. The method of claim 11, comprising:
requesting a policy and charging rules function to adjust the traffic and service steering related policies and rules in the traffic steering support function.

13. The method of claim 11, wherein at least a part of the service functions are controlled by a controlling unit communicating with the traffic steering support function via a reference point.

14. The method of claim 1, wherein the service function chain comprises a first set of the service functions for processing the user plane packets in a forward direction corresponding to a default direction of transmitting the user plane packets, and a second set of the service functions for processing the user plane packets in a backward direction.

15. A computer program product embodied on a non-transitory computer-readable medium, said product including a program for a control unit, comprising software code portions for performing the steps of claim 1 when the program is run on the control unit.

16. An apparatus for controlling a service function chain including service functions which process user plane packets, the apparatus comprising:
at least one processor; and
at least one memory including computer program code, the at least one memory and the computer program code configured to, with the at least one processor, cause the apparatus at least to perform:
providing a shared context comprising rules and policies for processing the user plane packets, the shared context being shared between the service functions of the service function chain;
reading the shared context;
adjusting traffic flow across the service function chain based on the rules and policies associated with the read shared context; and
applying a condition to at least one of the service functions in the service function chain that is checked at the service function.

17. The apparatus of claim 16, wherein the at least one memory and the computer program code are configured to, with the at least one processor, cause the apparatus to further perform:
acquiring at least one of status and context information from the service functions to generate and update the shared context.

18. The apparatus of claim 16, wherein the at least one memory and the computer program code are configured to, with the at least one processor, cause the apparatus to further perform:
modifying metadata of a network service header of the user plane packets to match the rules and policies associated with the read shared context.

19. The apparatus of claim 16, wherein the at least one memory and the computer program code are configured to, with the at least one processor, cause the apparatus to further perform at least one of:
providing one of a new service function and a service function chain;
branching the service function chain to another service function chain;
updating a service function forwarding unit to branch the service function chain to the other service function chain;
updating a classifying unit that identifies, from a user plane packet flow, the user plane packets to be redirected to the service function chain, to redirect the user plane packets;
at least one of dropping, modifying and inserting user plane packets from/into the service function chain; and
causing at least one of the service functions to transmit a control signal outside the service function chain.

20. The apparatus of claim 16, wherein at least one of the service functions is implemented in an application function, and the at least one memory and the computer program code are configured to, with the at least one processor, cause the apparatus to further perform:
adjusting traffic and service steering related policies and rules in a traffic steering support function.

21. The apparatus of claim 20, wherein the at least one memory and the computer program code are configured to, with the at least one processor, cause the apparatus to further perform:
  requesting a policy and charging rules function to adjust the traffic and service steering related policies and rules in the traffic steering support function.

22. The apparatus of claim 20, wherein the at least one memory and the computer program code are configured to, with the at least one processor, cause the apparatus to further perform:
  controlling at least a part of the service functions by a controlling unit communicating with the traffic steering support function via a reference point.

* * * * *